May 12, 1964     C. K. SCHILL ETAL     3,132,680

FEED WORM FOR MEAT GRINDERS

Filed July 20, 1962

INVENTORS.
Charles K. Schill
Hugh C. Kerr

BY

ATTORNEYS.

United States Patent Office 3,132,680
Patented May 12, 1964

3,132,680
FEED WORM FOR MEAT GRINDERS
Charles K. Schill and Hugh C. Kerr, Kansas City, Mo., assignors to Augco Products, Inc., Kansas City, Mo., a corporation of Missouri
Filed July 20, 1962, Ser. No. 211,251
7 Claims. (Cl. 146—185)

This invention relates generally to meat grinding machines and refers more particularly to improvements in the feeding worm thereof.

The conventional meat grinder in use today comprises generally a tube or cylinder having a cutting mechanism at one end and containing a feed worm which operates to deliver meat fed thereto from a feed hopper having lateral communication with the cylinder to and extrude it through the cutting mechanism. The feed worm is in the form of an elongate body having a spiral blade, the blade having curviform, smoothly contoured faces which converge toward the periphery to provide spiral cutting edges spaced by the outer peripheral surface of the blade.

Considerable difficulty is met with in attempting to grind frozen strips of meat in such grinders. These strips are generally relatively long and quite hard. The curviform surfaces of the blade tend to kick the strips back out of the feed zone rather than break or cut them and feed them into the cylinder. Consequently the operator must stand in constant attendance using either his hands or a tamper to force the meat into and hold it in engagement with the feed worm. This involves both danger to the operator and considerable loss of time.

One of the principal objects of the present invention is to provide an improved feed worm structure for meat grinders which is so constructed as to improve greatly the operation of the meat grinder particularly in the processing of frozen meat strips. We have found that in a grinder embodying our invention the time required to process and grind a given quantity of meat is reduced over fifty percent from that required in a conventional unit. For example, in one test run the time required with a conventional feed worm to grind one hundred twenty pounds of meat from frozen two inch strips was ten minutes, whereas with our improved auger construction the time for the same amount was four minutes.

A further object of the invention is to provide an improved feed worm which, even with unfrozen meat, increases greatly the grinding rate of the grinder and permits it to be run at substantially full capacity.

Still another object of the invention is to provide simple means for constructing an improved grinder having the characteristics and advantages set forth above utilizing a conventional feed worm as the basic structure thereof.

Other and further objects of the invention together with the features of novelty appurtenant thereto will appear in the course of the following description.

In the accompanying drawings which form a part of the specification and are to be read in conjunction therewith and in which like reference numerals indicate like parts in the various views.

Figure 1:
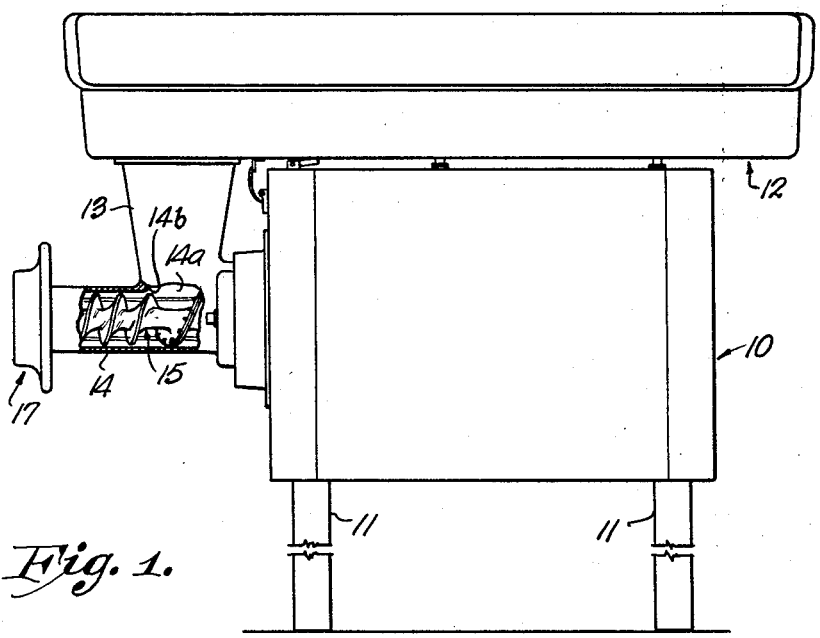
FIG. 1 is a side elevational view of a typical commercial meat grinder embodying a feed worm according to our invention, the cylinder and portions of the feed pan being broken away for purposes of illustration.

Referring to the drawings and initially to FIG. 1, reference numeral 10 indicates generally the housing for the power source and gear case (neither shown) of the machine. This is supported on legs 11 at a convenient height for the operator. Supported on top of housing 10 is a feed pan 12 from which meat can be fed to the hopper throat 13 into the grinder cylinder 14.

Figure 2:
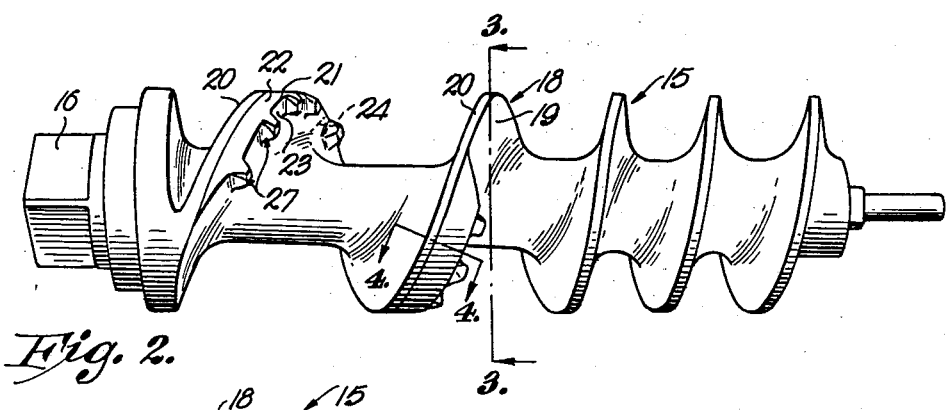
FIG. 2 is an enlarged side elevational view of the feed worm but with its ends reversed from the position illustrated in FIG. 1.

Disposed within the cylinder 14 is the feed worm 15. The worm is detailed in FIGS. 2, 3 and 4. The worm is rotatably supported within the cylinder and is connected with the power source through conventional means, the rectangular boss 16 at the inner end of the worm being engaged within a corresponding powered socket or chuck (not shown) on the gear train from the power source. Since these details play no part in the invention further description is believed unnecessary.

The outer end of the cylinder 15 terminates in a cutting mechanism 17 which is also of conventional construction. As is known, the cutting mechanism operates to reduce the meat to the desired particle size and consistency.

Returning to FIG. 1, the throat 13 communicates with the interior of cylinder 14 through a lateral opening 14a in the latter.

The feed worm 15 is of the type having the spiral blade 18 which has the advance face 19 and peripheral band-like surface 20. It will be noted that the blade is of the radially tapered type, the thickness in the axial direction decreasing toward the peripheral surface with the faces of the blade smoothly contoured into the main body of the worm.

Figures 3, 4:
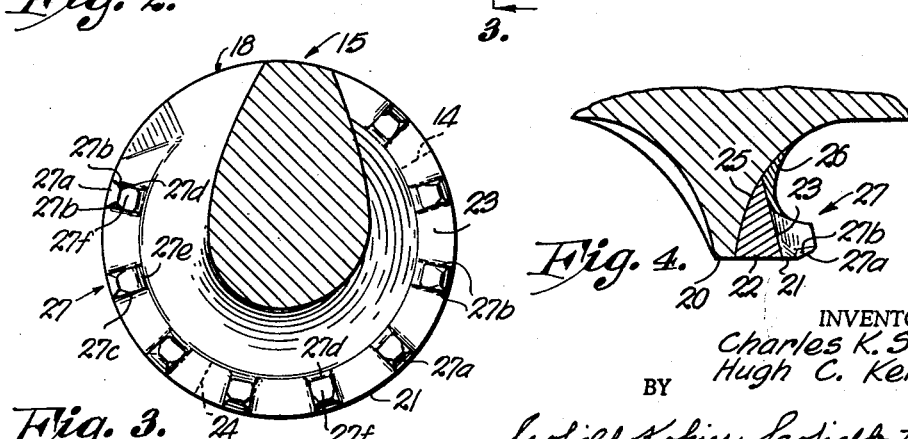
FIG. 3 is an enlarged cross sectional view taken generally along the line 3—3 of FIG. 2 in the direction of the arrows.
FIG. 4 is a greatly enlarged fragmentary sectional view taken along the line 4—4 of FIG. 2 in the direction of the arrows.

That portion of the blade 18 which registers with the opening 14a is constructed to provide a leading knife-like edge 21 which is formed as the juncture between an extension 22 of the peripheral surface 20 and a rearwardly relieved or inclined surface 23 forming the outer portion of the advance face of the blade over that portion registering with the opening 14a. The edge 21 and adjoining surfaces are preferably formed by securing spiral segments to the blade over said portions, the end joints between said segments being indicated at 24. As best seen in FIG. 4 each such segment is provided with an inner face 25 which is contoured to fit with the face of the blade. The segments are preferably brazed to the conventional worm, and weld metal 26 is deposited in such fashion as to provide a smooth essentially dished contour on the advanced face over that length of the blade which bears said segments. Obviously, once the segments are secured, the weld and segments can be plated to conceal the joints and weld.

It will be further evident from the drawing that provided at spaced intervals along the surface 23 adjacent the edge 21 are tooth-like projections 27. These are preferably formed integral with the segments and can be cast as a part thereof. Each element 27 is formed with a radially inwardly relieved outer face 27a flanked by diagonal beveled facets 27b. The opposite side faces 27c, 27d are substantially parallel and the lower face 27e is inwardly inclined slightly toward the axis of the worm from the tip of the projection inwardly. The tip 27f is preferably flat, thus providing the over-all projection with a blunt truncated configuration.

In operation, the strips of frozen meat are fed lengthwise through throat 13 while the worm is rotating. They are engaged by the projection 27 and edge 21 and these, acting in conjunction with the advance face of the blade serve to propel the portions of the strips within the cylinder toward the outer end of the cylinder. The cooperation between edge 21 and the edge 14b of opening 14a serves generally to slice or cut the meat strips and hold the end portions of strips within the space between the blade turns. The teeth also act to tear and split the meat into fragments which can be handled by the worm and both the teeth and rearwardly relieved surface 23 serve to inhibit the reverse thrust of the meat back through the hopper throat 13, something which inevitably occurs in the conventional auger. The beveled facets 27b assist in achieving smooth operation, as does the relieving of the outer surface 27a.

We have found through actual tests that frozen strips of meat in particular are fed uniformly and with great speed into a grinder having the auger of the construction described above. There is little tendency of the meat to attempt to back itself out of the hopper in response to the outward thrust exerted by the innermost surfaces of the blades. Moreover, breaking, fragmenting and cutting of the strips is facilitated greatly with the result that the meat is extruded on through the cylinder and discharged at a much greater rate than heretofore thought possible.

From the foregoing it will be seen that this invention is one well adapted to attain all of the ends and objects hereinabove set forth either with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. An improved feeding worm for meat grinders of the type having a cylindrical worm housing terminating at one end in a cutting mechanism and provided near its other end with a lateral feed opening through which material can be fed to the housing, said worm comprising an elongate body adapted to be disposed in said housing for rotation therein about its long axis, a spiral blade formed on said body having a portion thereof extending through the lengthwise section of the housing defined by said opening, the peripheral surface of said blade defining with the advanced face of the blade a leading edge, said advance face being relieved under said edge whereby the advance face forms an acute angle with said peripheral surface adjacent said leading edge, and a plurality of axially projecting laterally spaced teeth projecting from said advance face along said edge.

2. An improved feeding worm as in claim 1 wherein said teeth taper in radial thickness in the direction of projection.

3. An improved feeding worm as in claim 2 wherein one base edge of each tooth is flush with said peripheral surface.

4. An improved feeding worm as in claim 1 wherein each said tooth is provided with converging beveled facets along the outermost edges thereof.

5. An improved feeding form for meat grinders of the type having a cylindrical worm housing terminating at one end in a cutting mechanism and provided near its other end with a lateral feed opening through which material can be fed to the housing, said worm comprising an elongate body adapted to be disposed in said housing for rotation therein about its long axis, a spiral blade formed on said body having a curved advance face terminating at a spiral edge at the leading side of the narrow peripheral surface of the blade, a spiral segment having an outer surface disposed on said advance face forming a continuation of the peripheral surface of said blade, one face of said segment conforming to the curvature of said advance face and abutting same, the opposite face of said segment forming with said outer surface a spiral leading edge, said opposite face being inclined from said leading edge toward the advance face of the blade, and means securing said segment to said blade.

6. An improved feeding worm as in claim 5 wherein said segment includes on said opposite face a plurality of teeth spaced along said opposite face in the direction of spiral.

7. An improved feeding worm as in claim 5 wherein said last named means comprises a weld joining said segment to said blade.

References Cited in the file of this patent
UNITED STATES PATENTS

| | | |
|---|---|---|
| 2,841,197 | Ardrey | July 1, 1958 |
| 3,073,100 | Kingsley | Jan. 15, 1963 |